(12) United States Patent
Liu

(10) Patent No.: US 10,962,291 B2
(45) Date of Patent: Mar. 30, 2021

(54) METHOD, DEVICE AND SYSTEM FOR REGULATING CLIMATE

(71) Applicant: NANJING RUIQIHUANG ELECTRONIC TECHNOLOGY CO., LTD., Jiangsu (CN)

(72) Inventor: Jinke Liu, Shanxi (CN)

(73) Assignee: NANJING RUIQIHUANG ELECTRONIC TECHNOLOGY CO., LTD., Nanjing (CN)

( * ) Notice: Subject to any disclaimer, the term of this patent is extended or adjusted under 35 U.S.C. 154(b) by 24 days.

(21) Appl. No.: 15/963,085

(22) Filed: Apr. 25, 2018

(65) Prior Publication Data

US 2018/0238624 A1 Aug. 23, 2018

Related U.S. Application Data

(63) Continuation of application No. PCT/CN2017/087526, filed on Jun. 7, 2017.

(30) Foreign Application Priority Data

Jan. 17, 2017 (CN) .......................... 201710036961.1
Apr. 5, 2017 (CN) .......................... 201710218438.0

(51) Int. Cl.
*F28C 1/16* (2006.01)
*F28F 25/12* (2006.01)
*A01G 15/00* (2006.01)

(52) U.S. Cl.
CPC ................ *F28C 1/16* (2013.01); *A01G 15/00* (2013.01); *F28F 25/12* (2013.01)

(58) Field of Classification Search
CPC ... B01D 1/16; F28C 1/16; A01G 15/00; F28F 25/12; E04H 5/12
See application file for complete search history.

(56) References Cited

U.S. PATENT DOCUMENTS 5,284,628 A * 2/1994 Prueitt .................... F03G 6/045
                                                                               422/168
8,727,698 B1 * 5/2014 Pickett ...................... F03D 9/37
                                                                                415/1

(Continued)

FOREIGN PATENT DOCUMENTS

CN         102027869     *   4/2011
CN         102027869 A     4/2011

(Continued)

OTHER PUBLICATIONS

EPO translation of Hu CN 102027869 published Apr. 27, 2011 (Year: 2011).*

(Continued)

Primary Examiner — Stephen Hobson

(57) ABSTRACT

A method for regulating climate, comprising: 1) allowing the formation of a relatively high temperature zone and a low temperature zone in the air above the ground; 2) allowing the formation of air convection between the high temperature zone and the low temperature zone as the cold air in the low temperature zone has a greater density than the hot air in the high temperature zone. A device for regulating climate is, i.e. an automatic air tower. The automatic air tower comprises a column (1) with an air inlet (12) at the bottom, wherein the column comprises a startup unit (13) and a shutdown unit (14) inside and has an air outlet (15) at the top. The aforesaid method and tower can prevent and eliminate the formation of haze and cool the earth's ground.

1 Claim, 9 Drawing Sheets

(56) References Cited

U.S. PATENT DOCUMENTS

| | | | | |
|---|---|---|---|---|
| 2008/0257977 A1* | 10/2008 | Chan | .................... | A01G 15/00 239/14.1 |
| 2009/0152370 A1* | 6/2009 | Pesochinsky | ........... | F03G 6/045 239/2.1 |
| 2010/0074390 A1* | 3/2010 | Nakamura | ............. | A01G 15/00 376/391 |
| 2019/0000021 A1* | 1/2019 | Huang | ................... | A01G 15/00 |

FOREIGN PATENT DOCUMENTS

| | | |
|---|---|---|
| CN | 104412875 A | 3/2015 |
| KR | 20160017171 A | 2/2016 |
| RU | 2316205 C2 | 2/2008 |
| WO | 0033638 A9 | 7/2001 |

OTHER PUBLICATIONS

International Search Report of PCT Patent Application No. PCT/CN2017/087526 dated Sep. 28, 2017.

* cited by examiner

METHOD, DEVICE AND SYSTEM FOR REGULATING CLIMATE

CROSS REFERENCE TO RELATED APPLICATION

The present application is a Continuation Application of PCT application No. PCT/CN2017/087526 filed on Jun. 7, 2017, which claims the benefit of Chinese Patent Application Nos. 201710036961.1 filed on Jan. 17, 2017 and 201710218438.0 filed on Apr. 5, 2017. The contents of all of the above are hereby incorporated by reference.

TECHNICAL FIELD

The invention relates to the field of environmental pollution regulation, in particular to a method, device and system for regulating climate.

BACKGROUND

Until now, there is still no mature case of clearing haze and preventing the formation of haze by means of changing the state of the atmosphere and increasing the air convection. Haze clearing approaches adopted currently are nothing more than clearing the haze of a limited space by an air purifier, utterly inadequate in dealing with the haze of a greater region. Some haze free towers are locally set up in hazy cities, which require large quantities of energy consumption to realize the clearance effect, and the scope of clearance is restricted.

National policies on restricting polluting activities and implementing traffic control can only mitigate the magnitude or influence of the haze to a certain extent. Such approaches usually take a country several decades' effort and are incapable of eliminating adverse effects of the haze, high temperature, etc. on the country. Besides, the effects of such administrative intervention are limited, which cannot clear the haze of a region once severe haze occurs.

Some existing patents on haze free towers propose to set up the towers in frequently influenced cities. These towers usually need large quantities of energy supply to maintain the purification process, and a large number of towers must be set up to achieve a limited scale of purification. Such design approaches have no other ecological effects such as improving the climate, and there are still pollutants to be treated after the purification process is completed. Most haze free towers adopt water purification. Such approaches are not environmentally friendly or energy-conserving, usually leading to the waste of energy and water as well as water pollution.

Existing purifiers need continual electric energy in operation, while the new device/system of this invention needs no artificial energies (power, heat, etc.) to maintain its operation once started. The tower will automatically and sustainably guarantee the upward movement of air flow in the column.

Daan Roosegaarde, a Dutch designer, has designed a small and compact haze free tower. The tower absorbs the haze and collects particles inside, but it cannot effectively eliminate hazardous gases or clear the haze in a wider region. It is hardly workable for such a regional weather phenomenon as haze.

At present, there are no operational approaches for cooling the earth, promoting the rainfall in drought-hit areas and reducing the formation of super typhoons in the short run.

SUMMARY OF THE INVENTION

In view of aforesaid shortcomings of existing approaches, the invention proposes a method, device and system for clearing the haze and regulating the climate that can deal with haze pollution, desertification of drought-hit areas, global warming and the formation of super typhoons. The aim is to effectively prevent and control the haze as well as regulate and improve interregional rainfalls and the climate environment.

The invention is achieved through the following technical scheme:

A method for regulating climate includes the following steps:

step 1): allowing the formation of a relatively high temperature zone and a low temperature zone with different temperatures in the air above the ground;

step 2): allowing the formation of air convection between the high temperature and the low temperature zone as the cold air in the low temperature zone has a greater density than the hot air in the high temperature zone.

Further, in the step 1), forming a bottom-to-top vertical air convection pathway between the ground and the stratosphere. Forming the high temperature zone since air in the convection pathway has a higher temperature, and forming the low temperature zone since air outside the convection pathway has a lower temperature, resulting in a temperature and a density differences to form a continual momentum that drives air outside to flow inside the pathway continuously.

After the step 2), further comprises:

step 3): leading the formation of a wider range of air convection;

step 4): forming a cloud band by the moist air transmitted through the air convection pathway, under which is a cold zone while the cloudless band is a hot zone. Air descends in the cold zone and ascends in the hot zone, resulting in regional air convection and the formation of the wind;

step 5): producing rain and snow by the cloud band that wash up the air and haze when falling.

Further, in the step 1), forming a low temperature zone is above the ground, wherein air temperature in the low temperature zone drops and density increases, and the air flows downwards in the low temperature zone;

in the step 2), making the air above the low temperature zone continuously flows downwards, wherein air flowing downwards gradually diffuses to form a cold wind zone;

After the step 2), further comprises:

step 3): making the cold wind zone constantly expands, the temperature gradient from the ground to the upper air gradually decreases due to the natural air convection; the cold zone becomes thicker and larger continuously;

step 4): upper air of the cold wind zone undergoes decreasing heating effect of the ground, of which the temperature drops and density increases, leading to the air flow above the cold wind zone moving toward the cold wind zone; the specific gravity of air in the cold zone is greater than that of the air from the hot zone, resulting in gradually increasing lateral expansion speed of the cold zone; cold air around flows into the cold wind zone to form a cold air column therein;

step 5): driving internal cold air in the cold air column to an adjacent city as the continual expansion of the cold air column to clarify the urban air;

step 6): when encountering natural wind with greater air flow velocity than the cold wind zone during the cold wind zone expansion process, gradually blowing away the cold wind zone by the natural wind; automatically re-forming the cold wind zone and starting the process in step 1) when the natural wind passes by.

Further, a device for regulating climate applies to the method for regulating climate;

the device is an automatic air tower, the automatic air tower comprises a column having an air flow pathway, wherein the column has an air inlet at the bottom and an air outlet at the top, and comprises a startup unit and a shutdown unit inside;

the startup unit works to control air temperature inside the column to be higher than the outside, so that the air outside the column flows into the air flow pathway in the column through the air inlet and then out through the air outlet, generating an initial bottom-to-top air flow in the air flow pathway.

The startup unit shuts down to form air temperature and density differences since air temperature in the air flow pathway is higher than that outside the pathway, so that the bottom-to-top air flow will continue to be automatically generated in the air flow pathway;

the shutdown unit terminates the continuous formation of the bottom-to-top air flow in the column; the column has a proper height to allow bottom air to rise to the stratosphere.

Further, the startup unit is a temperature control unit, wherein the temperature control unit increases the temperature difference between bottom and top of the column and allows the formation of the initial bottom-to-top air flow in the air flow pathway.

Further, the column has a secondary convection trigger at the top, wherein the secondary convection trigger assists air inside and outside the air flow pathway in generating a wider range of air convection.

Further, the column has multiple support columns as the base support at the bottom, wherein the support columns have such spacing that is used as the air inlet.

Further, the column is higher than 200 m, being a truncated-cone-type column or multi-prism column, the top air outlet of the column has a diameter of 100-400 m and the bottom diameter of the column is 0.15-1 km. cylindrical column or prismatic Further, the column is higher than 200 m, being a cylindrical column or prismatic column, the top air outlet of the column has a diameter of 100-400 m and the bottom diameter of the column is 100-500 m.

Further, a system comprises multiple devices for regulating climate according to any of claims 4-9, wherein the devices are set up in coastal cities or on sea islands where strong typhoons or cyclones can be developed, and the multiple devices operate simultaneously.

Or further, a device for regulating climate applies to the method for regulating climate. The device comprises a cold wind tower built on a ground higher than the city, and temperature difference exists between the lower and upper parts inside of the cold wind tower;

the cold wind tower comprises tower top and tower bottom; the cold wind tower comprises a startup unit and a shutdown unit inside, with an air outlet at the bottom; wherein the area of the air inlet of the tower top is larger than that of the air outlet at the bottom;

when the startup unit works, air temperature drops and density increases in the cold wind tower. Air temperature in the cold wind tower becomes lower than that outside the tower. The density difference between the inside and the outside of the cold wind tower results in the momentum for the operation of the cold wind tower; cold air near the tower top enters into the cold wind tower and flows out through the air outlet; the cold air flows outwards expands into a cold wind zone. Therefore, in the technical scheme of the invention, the cold wind tower conducts temperature reduction only upon startup and enters the working state within a short period. In a steady working state, continual and stable temperature and density differences are produced between inside and outside of the cold wind tower, which is the momentum for automatic operation of the cold wind tower. Thus, the cold wind tower enters the continual and steady state. In addition, there is no power consumption after the tower is started, thus no secondary pollution occurs.

Further, the startup unit is a cooling device, wherein the cooling device is mounted at the tower top, which sprinkles cold water into the cold wind tower from the tower top till there is continual and steady air outflow at the air outlet. Thus, air temperature drops and density increases in the cold wind tower. Air temperature in the cold wind tower becomes lower than that outside the cold wind tower. The air density difference between the inside and the outside of the cold wind tower results in the momentum for the operation of the cold wind tower.

Further, the shutdown unit is an igniter mounted at the tower bottom; the igniter works to increase air temperature inside the cold wind tower. Thus, air densities inside and outside the cold wind tower equalize and inside-to-outside air flow stops.

Further, the shutdown unit comprises a ventilation port in the tower wall of the cold wind tower and a roller blind to cover up the ventilation port. When the roller blind is opened, cold air in the cold wind tower flows outwards through the ventilation port, and the formation of the cold wind zone stops.

Further, the cold wind tower is 200-300 m in height. Air inlet area at the tower top is 20,000-100,000 m$^2$ and air outlet area at the tower bottom has is 10,000-50,000 m$^2$.

Further, the pathway in the cold wind tower is an upside-down truncated-cone-type. The inner diameter of the tower top is greater than that of the tower bottom.

Further, the cold wind tower is set up on a ground higher than the city, resulting in a differential elevation of 500-2,500 m between the top of the cold wind tower and the city. Thus, the air temperature difference between the tower top and the tower bottom is around 7° C., which is more favorable for the operation of the cold wind tower.

Further, a system of the device for regulating climate, wherein, the system comprises at least one device for regulating climate so as to effectively eliminate air haze.

Beneficial effects of the invention are as follows:

(1) To prevent and restrain the climate conditions of haze

As it is known, there will be no haze as long as there is wind or drop in temperature. The cold wind tower is invented just on the basis of such natural phenomena. The tower continuously delivers cold wind to a city, which makes it impossible for haze particles to gather over the city. Suspended particles are diluted by thousands of times and then gradually settle.

(2) To continuously supply fresh and cold air to a city

The device and system supplying fresh air to a city constructed on the basis of the cold wind tower not only disperses the haze, but also brings fresh air from mountainous areas to the city. In summer, it brings refreshing cool breezes to the hot city, not only cooling the city down but also benefits the people.

(3) To clean city air

The cold wind tower causes drop in temperature in a large region. When hot air from other regions meets cold air from the tower, more humid air condensates into water drops in the cold wind zone and thus produces clouds and light rains. This atmospheric action can help the city to purify the air.

(4) Or to apply the automatic air tower to trigger large-scale vertical air convection which transmits hot air from the ground to the stratosphere in the upper air.

(5) To set up several automatic air towers to trigger large-scale air convection between the sea and the land, so as to prevent and inhibit the unfavorable climate conditions that lead to the haze and reduce and settle the haze.

(6) When the automatic air tower is in operation, once an air flow is generated, it no longer needs any energy to maintain motions of the air flow. The automatic air tower will spontaneously generate convective air without energy support from the outside. Thus, this approach is energy-saving and environmentally friendly.

(7) To set up automatic air towers on Sea Islands where strong typhoons and cyclones can easily form so as to reduce or avoid the formation of strong and super typhoons.

(8) To set up automatic air towers to create vertical air convection and realize large-scale cloud formation in the upper air, so as to reflect the solar light and thus reduce temperature of the ground

DETAILED DESCRIPTION OF THE PREFERRED EMBODIMENT

Figure 1:
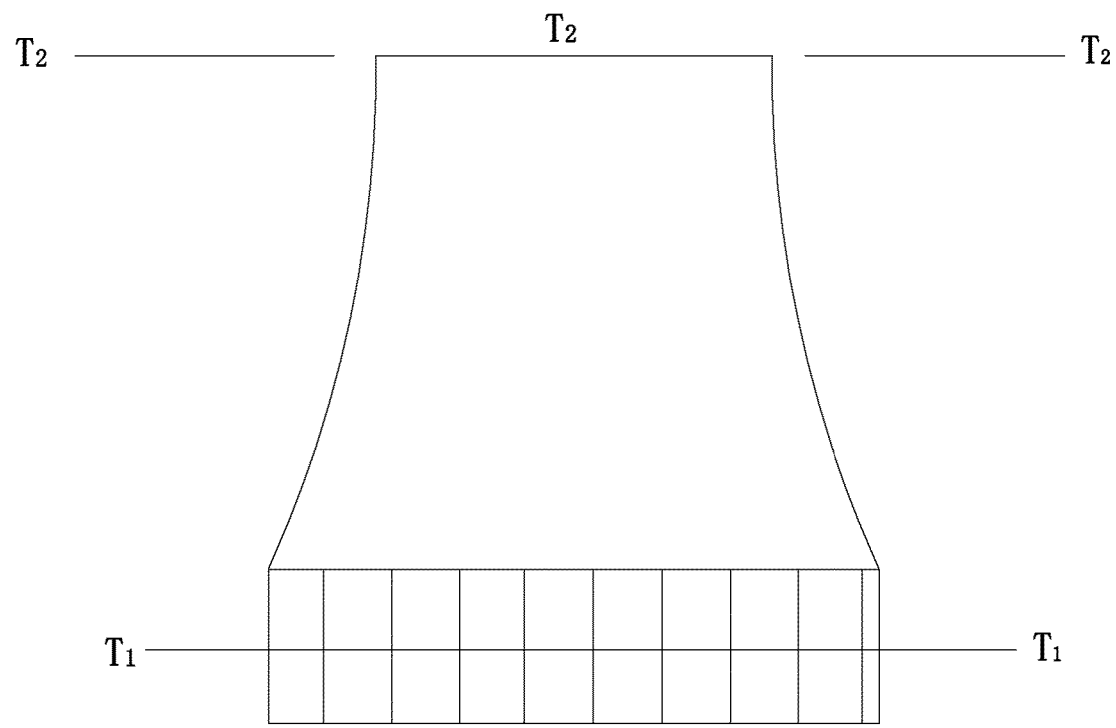
FIG. 1 is a representation of temperatures of air flows inside and outside the automatic air tower before it is started in Example 1.

The preferred embodiments of the invention are given below in combination with the drawings. It should be understood that the examples described herein are only for the purpose of explaining the invention and not limiting the invention. Besides, technical features mentioned in the embodiments of the invention below, as long as not in conflict, can be combined for use.

Example 1

In Example 1 of the invention discloses a method for regulating climate, including the following steps:

step 1): allowing the formation of a relatively high temperature zone and a low temperature zone with different temperatures in the air above the ground;

step 2): allowing the formation of air convection between the high temperature zone and the low temperature zone as the cold air in the low temperature zone has a greater density than the hot air in the high temperature zone.

Further, in the step 1), forming a bottom-to-top vertical air convection pathway between the ground and the stratosphere. Forming the high temperature zone since air in the convection pathway has a higher temperature, and forming the low temperature zone since air outside the convection pathway has a lower temperature, resulting in a temperature and a density differences to form a continual momentum that drives air outside to flow inside the pathway continuously;

After the step 2), further comprises:

step 3): leading the formation of a wider range of air convection;

step 4): forming a cloud band by the moist air transmitted through the air convection pathway forms, under which is a cold zone while the cloudless band is a hot zone. Air descends in the cold zone and ascends in the hot zone, resulting in regional air convection and the formation of the wind;

step 5): producing rain and snow by the cloud band that wash up the air and haze when falling.

As shown in FIGS. 1~3, 4A, 4B, 5A and 5B, Example 1 of the invention discloses a device for regulating climate, the tower is an automatic air tower, wherein the automatic air tower comprises a column (1) having an air flow pathway (11), wherein the column (1) has an air inlet (12) at the bottom and an air outlet (15) at the top, and comprises a startup unit (13) and a shutdown unit (14) inside; air flows into the air flow pathway (11) in the column through the air inlet (12) and then out through the air outlet (15), wherein the startup unit (13) works to generate a bottom-to-top air flow in column (1); the shutdown unit (14) works to terminate the continual formation of the bottom-to-top air flow in the column; the column (1) has a proper height to allow bottom air of column (1) to rise to the stratosphere.

Wherein, column (1) can be set up in two forms: table and cylinder. The former can be a truncated-cone column, a square column or a prism column with a smaller top and a larger bottom; the latter can be a cylinder or a prismatic cylinder of the same up-and-down size. Obviously, there may be a cap or other additional structures designed for the top of a cylindrical column (1), which is not detailed herein. Besides, with the basic forms of table and cylinder, the column may be transformed in adaptation to plains, slopes, valleys, etc. so as to minimize the height and reduce the cost.

In Example 1 of the invention, column (1) has a minimum height of 200 m. In examples of the invention, a column height is taken as 200-500 m; for truncated-cone type or multi-prism column, the top air outlet has a diameter of 100-400 m while the bottom diameter is 0.15-1 km; when column (1) is a cylindrical or prism column, the top air outlet (15) of column (1) has a diameter of 100-400 m and the bottom diameter is 100-500 m.

In Example 1 of the invention, startup unit (13) is a temperature control unit, wherein the temperature control unit increases the temperature difference between bottom and top of column (1) so that hot air around column (1) is continuously transferred to the upper air through column (1) to further allows the formation of the initial bottom-to-top air flow in the column (1).

In examples of the invention, it is preferable to set up a secondary convection trigger (16) at the top of column (1) to assist in generating greater convection of air inside column (1). The secondary convection trigger (16) utilizes the huge power generated by the primary air convection triggered by startup unit (13), so as to generate a wider range of air convection.

In Example 1 of the invention, the bottom of column (1) is preferably built on multiple support columns (17) as the base support at the bottom, the spacing of which constitutes the air inlet (12).

In Example 1 of the invention, multiple automatic air towers constitute a system for regulating climate, preferably at least 5 towers being set up in coastal cities or on Sea Islands where strong typhoons or cyclones can be developed. Wherein, automatic air towers work simultaneously to eliminate the haze and regulate atmosphere of several neighboring provinces and regions. When set up in coastal cities, the system can effectively drive away the haze of the whole country and transfer humid air to drought-hit regions, thus to promote rainfalls in these regions and neutralize the adverse impact of typhoons and hurricanes hitting the country. When set up on Sea Islands, the system can reduce temperature of the waters and effectively reduce or mitigate the formation of strong and super typhoons.

In Example 1 of the invention, the working principle of the device and system for regulating climate is as follows:

As shown in FIG. 1, a truncated-cone-type column is taken for instance in examples of the invention. The column is 0.5 km high. The top air outlet is 400 m in diameter. When the bottom diameter of the column is 1 km, the temperature drops 0.6° C. at every 0.1 km elevation rise in the lower troposphere. Before the automatic air tower starts, the atmospheric temperatures inside and outside column (1) can be described as follows: T1 and T2 are the isotherms in parallel with the sea level and T1>T2. There is temperature difference between the upper and lower parts of column (1), which is the momentum for the operation of the automatic air tower.

When the automatic air tower is in operation, the startup unit (13) supplies the heat that enables the air inside the column to come up due to a smaller density when heated, in which case an upflow is continuously generated in column (1). When the startup unit stops, air still continuously flows in through the bottom air inlet of column (1), in which case, air temperature at the air inlet (12) of column (1) becomes equal to that at air outlet (15) of column (1). A steady state of temperature inside the column (1) is reached, which is called the internal temperature equalization state.

Figure 2:
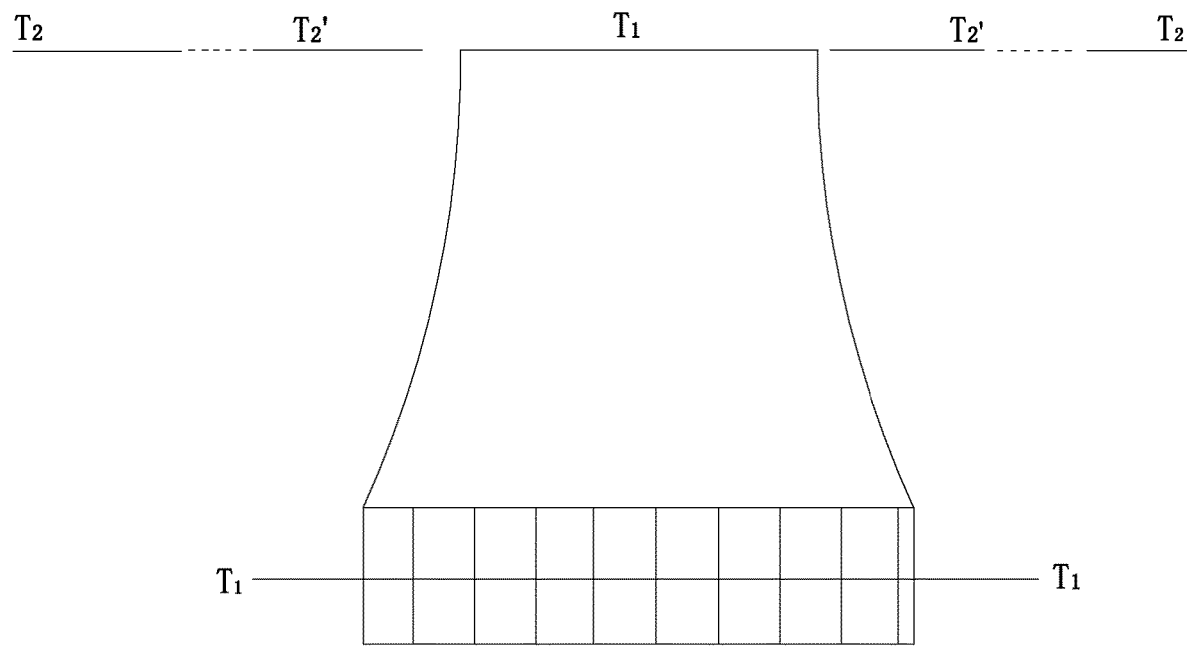
FIG. 2 is a representation of temperatures of air flows inside and outside the automatic air tower after a period of steady operation of the tower in Example 1.

The automatic air tower stabilizes after a period time of operation, as shown in FIG. 2. Attributed to the horizontal air flow control, the isotherm of T1 maintains invariant, still in parallel to the seal level. This is also due to the lack of a supporting upflow. In this case, the isotherm of T2 moves downwards within a certain space outside column (1). A T2 zone is formed near the top of T1 outside column (1), in which the air temperature gradient will disappear as well. After that, the temperature at the top outside column (1) changes to T2' and T2'<T2. Now, the air temperature difference between the inside and the outside of column (1) can be as great as around 3° C. At this point, continuous and stable temperature and density differences are formed inside and outside column (1), which become the momentum for the automatic operation of column (1). From this moment on, the column enters into a continuous and stable working state. This process is called the primary triggering and the first effect.

Figure 3:
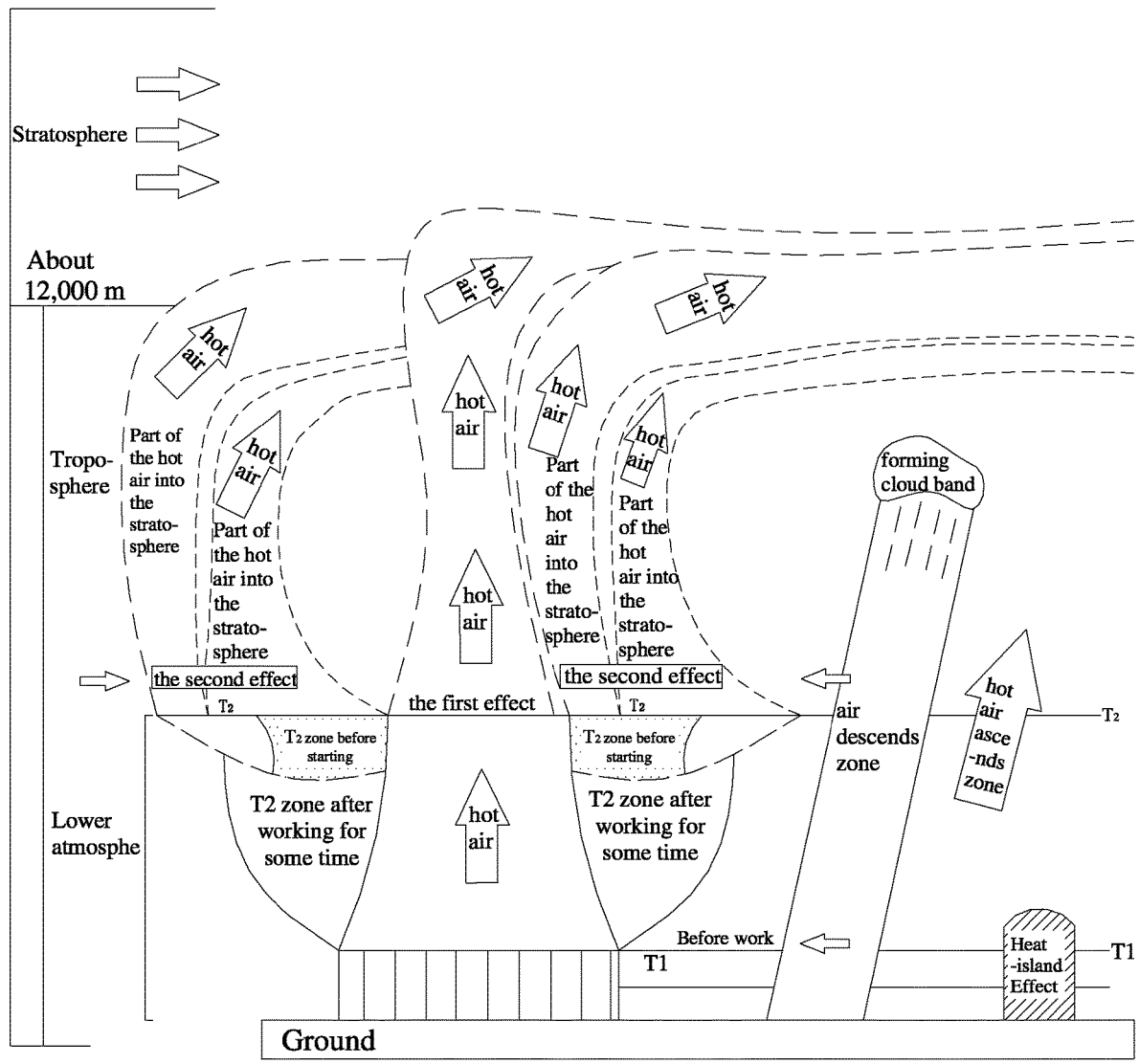
FIG. 3 is a representation of the ecological effect by the automatic air tower in Example 1.
Figure 4A:
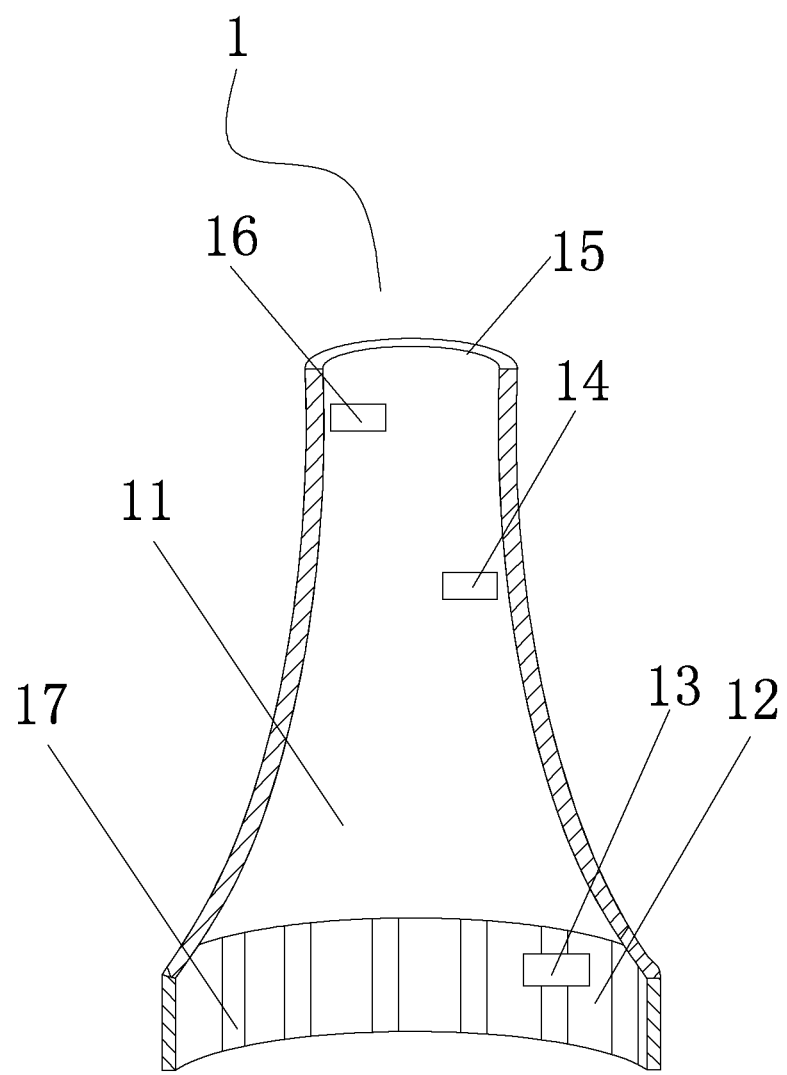
FIG. 4A is a representation of the sectional structure of a truncated-cone-type column in Example 1.
Figure 4B:
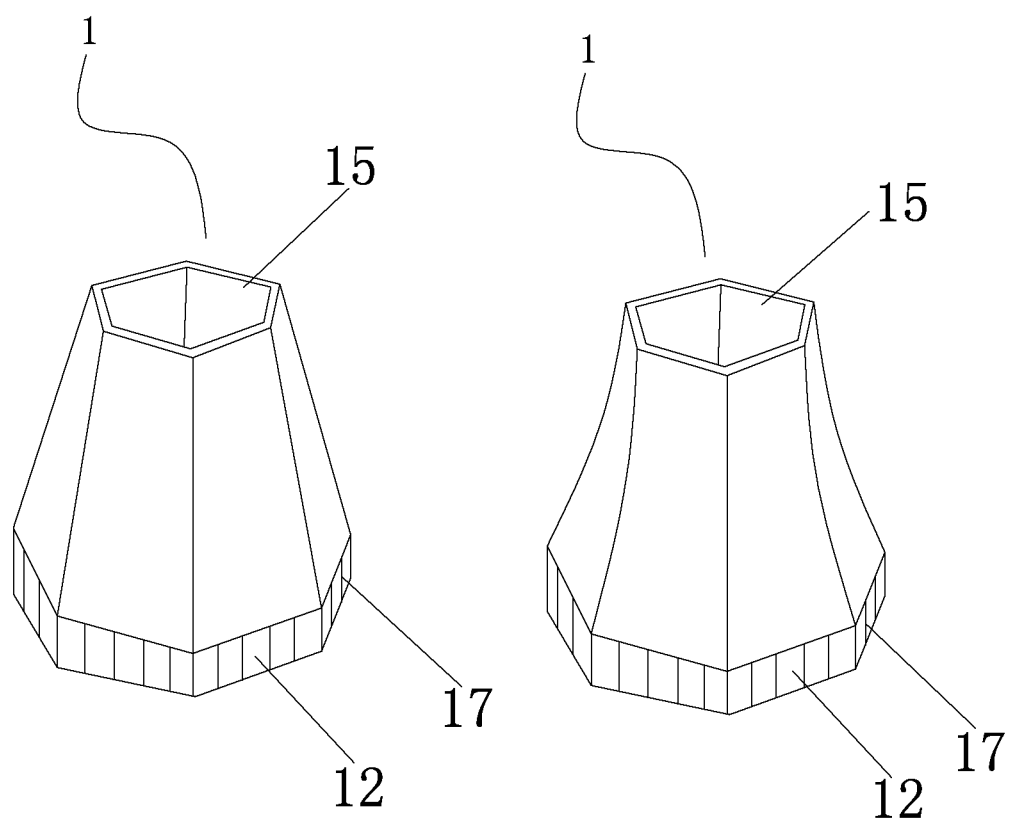
FIG. 4B is a representation of the sectional structure of a multi-prism-table column in Example 1.
Figure 5A:
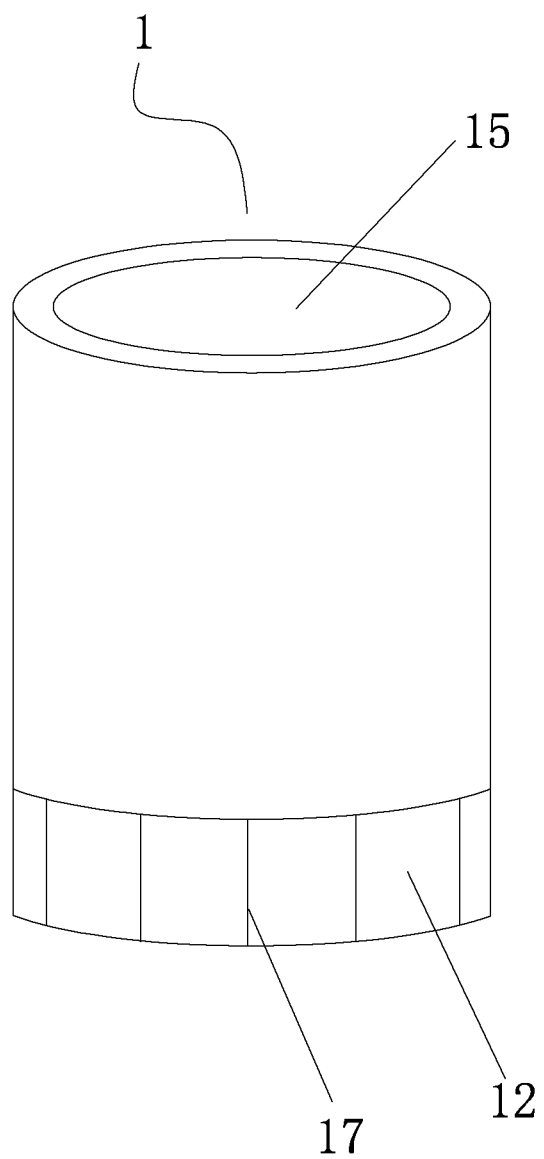
FIG. 5A is a representation of the sectional structure of a cylindrical column in Example 1.
Figure 5B:
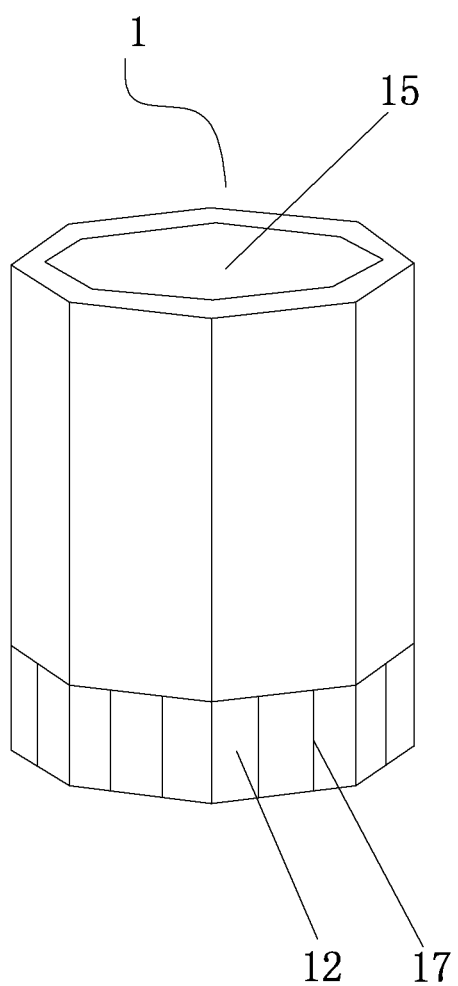
FIG. 5B is a representation of the sectional structure of a prism column in Example 1.

As shown in FIG. 3, since entering into the continuous and stable working state, the automatic air tower starts the continual operation process without attenuation. To shut down the air tower, it is only necessary to stop shutdown unit (14). At the top of column (1) is provided a secondary convection trigger (16). The trigger (16) can produce a wider range of air convection, i.e. the secondary effect, by utilizing the enormous power generated by the first convection of column (1).

Further, the first and second effects trigger the third effect. A cloud band is formed when column (1) transports moisture. A cold zone is formed under the cloud band due to the lack of solar radiation while the cloudless zone becomes the hot zone attributed to solar radiation. Air descends in the cold zone and ascends in the hot zone, generating a sizable local convection, i.e. the wind; the formation of cloud will trigger the fourth effect, that is, the cloud band produces rain and snow that clean up the air and haze when falling.

In Example 1 of the invention, the automatic air tower produces the following ecological effects: the automatic air tower works continuously to intensify air convection and produce a local wind (a breeze or slack wind) to drive away the haze; interregional air convection transports humid and warm temperature from coastal areas to the inland drought-hit areas, during which rain is formed for the desert and drought-hit areas, while excessive moisture and temperature are removed from the hot and humid coastal areas. When the quantity of air towers reaches as many as 20, a total precipitation of 20 billion tons is anticipated to be brought along to the western drought-hit areas. While automatic air towers are set up in north and east China, the precipitation it brings along can benefit the northwest areas by improving local ecology, control desertification and reduce droughts in the Great Northwest of the country. A single automatic air tower is capable of making over tens of thousands of cubic meters of cloud per second. The cloud veil can effectively reflect solar radiation and lower the temperature of the earth. The local temperature reduction effect can be as great as 1-3° C. In rain belt zones, the annual average temperature can also be lowered to some extent.

Aiming at such a particular climate phenomenon as haze, the approach of changing the atmospheric convection can fundamentally eradicate and prevent the haze and other climate problems. Such an approach is not only direct but more efficient. A system that clears up the haze and regulates climate can produce sizable air convection both vertically and transversely in a region so as to effectively blow away and settle the haze. According to the invention, once started, the automatic air tower is capable of continuously working without additional energy. In the purification process, the tower can effectively clean and settle the pollutants in a large area with no secondary pollution. The system of the invention is expected to be constructed in 5 years. After completion, it can fundamentally prevent and eradicate the unfavorable climate factors contributing to the haze within a very short time. The automatic air tower and the system can eliminate the haze in a short time, bring along several beneficiary ecological effects and improve climate. The long-time operation of the system can effectively lower the temperature of the earth, mitigate the desertification effect and relieve the adverse impact of super typhoons.

Example 2

The invention may be embodied in another way. Example 2 of the invention discloses a method for regulating climate, including the following steps:

step 1): allowing the formation of a relatively high temperature zone and a low temperature zone with different temperatures in the air above the ground;

step 2): allowing the formation of air convection between the high temperature zone and the low temperature zone as the cold air in the low temperature zone has a greater density than the hot air in the high temperature zone.

in the step 1), forming a low temperature zone above the ground, wherein air temperature drops and density increases and the air flows downwards in the low temperature zone;

in the step 2), making the air above the low temperature zone continuously flows downwards, wherein air flowing downwards gradually diffuses to form a cold wind zone;

After the step 2), further comprises:

step 3): making the cold wind zone constantly expands, the temperature gradient from the ground to the upper air gradually decreases due to the natural air convection; the cold wind zone becomes thicker and larger continuously;

step 4): the upper air of the cold wind zone undergoes decreasing heating effect of the ground, of which the temperature drops and density increases, leading to the air flow above the cold wind zone moving toward the cold wind zone; the specific gravity of air in the cold zone is greater than that of the air from the hot zone, resulting in gradually increasing lateral expansion speed of the cold wind zone; cold air around the cold wind zone flows into the cold wind zone to form a cold air column therein;

step 5): driving internal cold air in the cold air column to an adjacent city as the continual expansion of the cold air column to clarify the urban air;

step 6): when encountering natural wind with greater air flow velocity than the cold wind zone during the cold wind zone expansion process, gradually blowing away the cold wind zone by the natural wind, when the natural wind passes by, automatically re-forming the cold wind zone and starting the process in step 1).

Further, comprises the following step: when encountering natural wind with greater air flow velocity than the cold wind zone during the expansion process, gradually blowing away the cold wind zone by the natural wind. When the natural wind passes by, automatically re-forming the cold wind zone and starting the process in step 1). Thus, a continual cold wind zone generates cold air flow that becomes the source of cooling breeze to the urban area. The city will enjoy clean and fresh air with proper temperature reduction.

Figure 6:
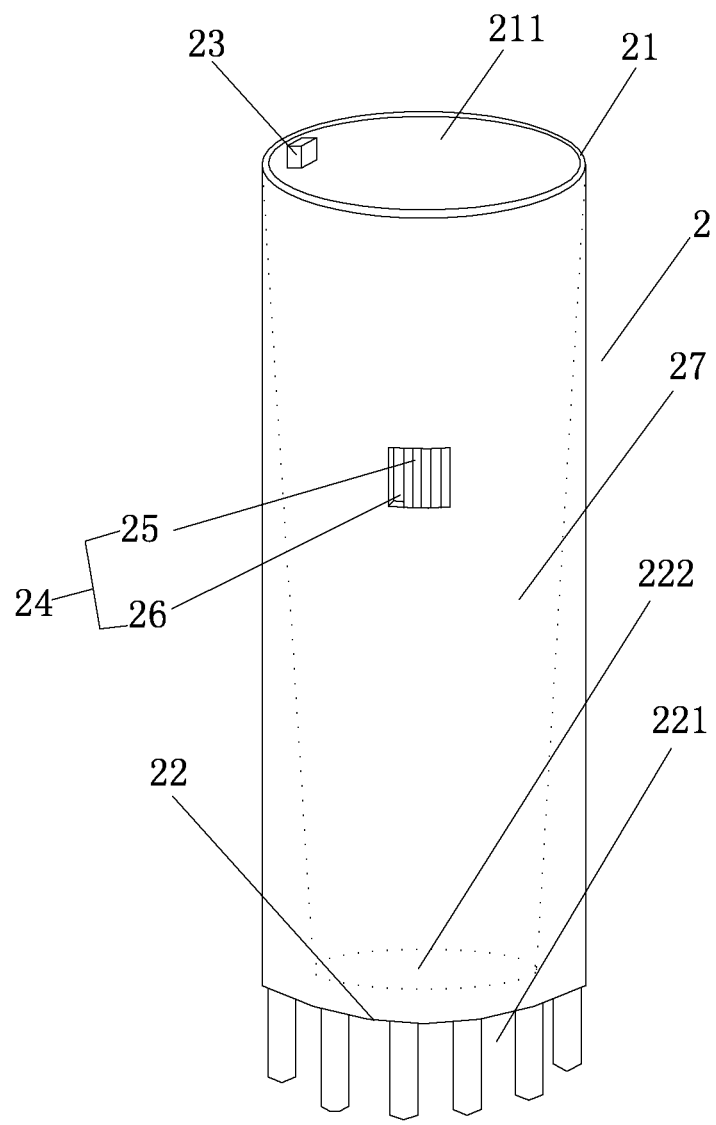
FIG. 6 is a representation of the structure of the cold wind tower in Example 2.
Figure 7:
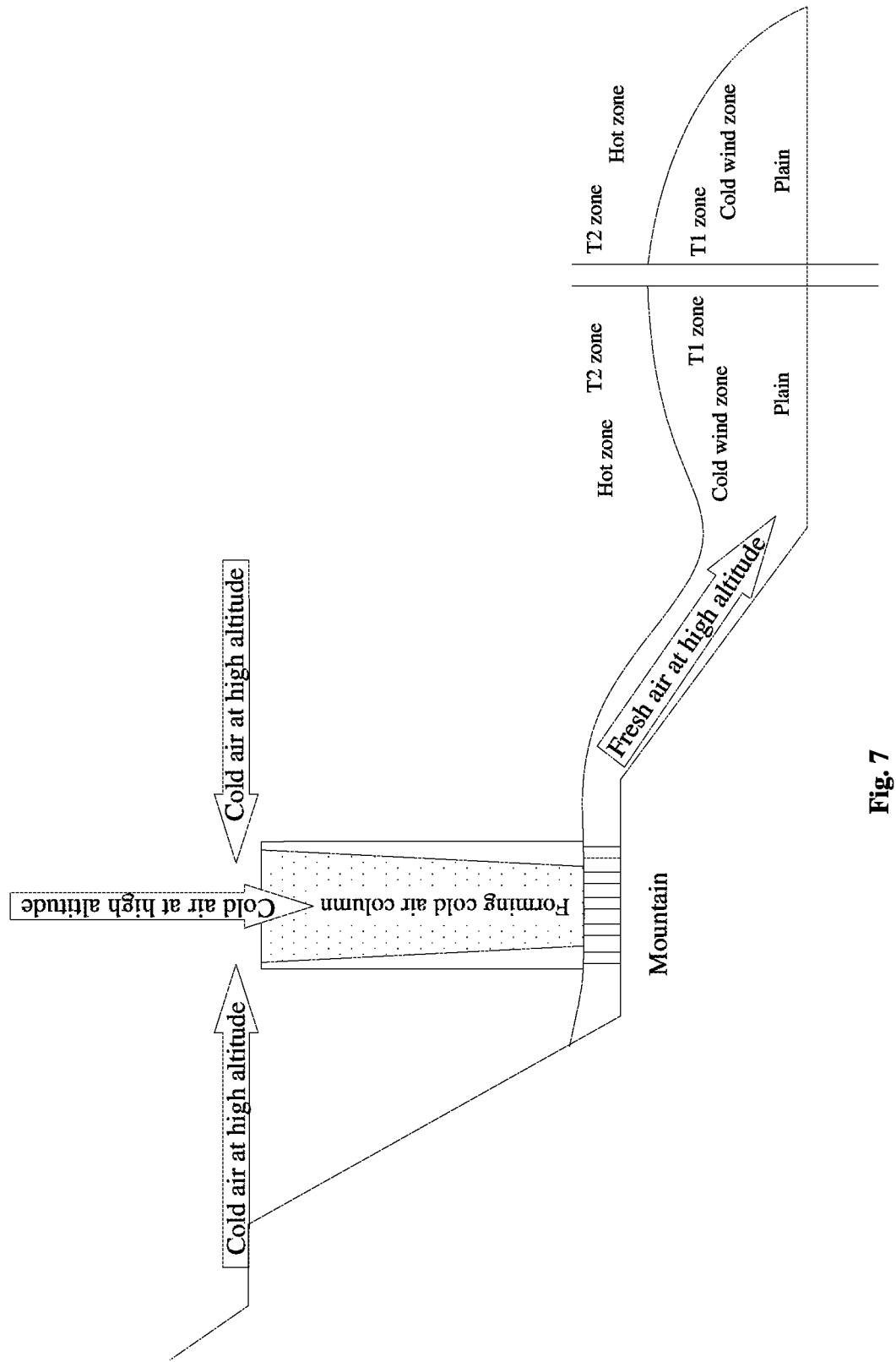
FIG. 7 is a representation of the working principle of the cold wind tower in Example 2.
Figure 8:
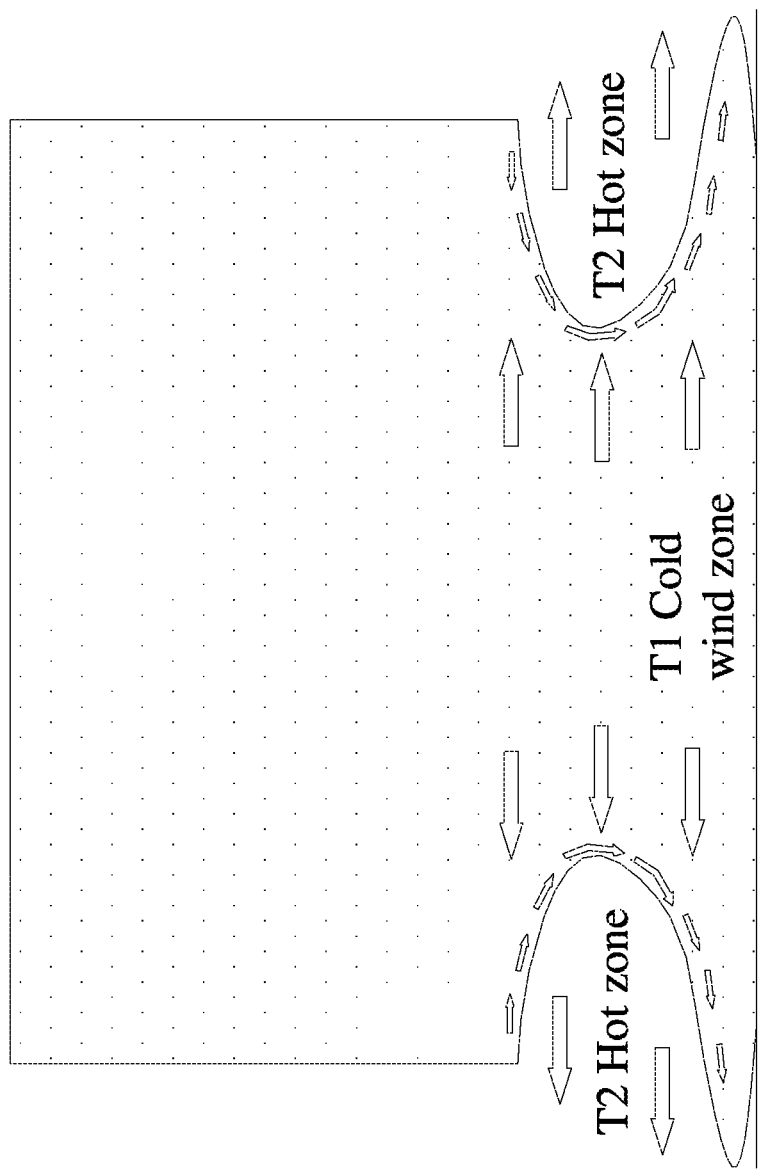
FIG. 8 is a representation of the working principle of the cold wind zone in Example 2.

As shown in FIGS. 6-8, in Example 2 of the invention, a device for regulating climate comprises a cold wind tower (2) built on a ground higher than the city, in which there is air temperature difference between the upper and the lower parts thereof; cold wind tower (2) comprises a tower top (21) and a tower bottom (22), in which a startup unit (23) and a shutdown unit (24) are provided. At a side of the tower bottom (22) is provided with an air outlet (221); the air inlet (211) of tower top (21) has a larger area than the air outlet (222) at the tower bottom (22); when startup device (23) works, air temperature drops and density increases in cold wind tower (2). Air temperature inside cold wind tower (2) becomes lower than that outside the tower, leading to the air density difference inside and outside cold wind tower (2) that ultimately becomes the power for the operation of the cold wind tower. The cold air near the tower top (21) enters into cold wind tower (2) and then flows out through the air outlet (221) at the tower bottom (22). Obviously, cold wind tower (2) only needs cooling at startup and enters into the working state in a short time. In a steady working state, continual and stable temperature and density differences are produced between the inside and the outside of cold wind tower (2) which is the momentum for automatic operation of the cold wind tower. Thus, the cold wind tower enters the continual and steady state. In addition, there is no power consumption after cold wind tower (2) is started, thus no secondary pollution occurs.

Preferably, in examples of the invention, the startup unit may be a cooling device mounted at the tower top (21), which sprinkles cold water from the tower top (21) into the cold wind tower till air flow from the tower bottom (22) of cold wind tower (2) stabilizes. Then, water sprinkling stops. Thus, air temperature drops and density increases in cold wind tower (2). Air temperature in the cold wind tower becomes lower than that outside the tower. The air density difference between the inside and the outside of the cold wind tower results in the momentum for the operation of the cold wind tower.

In examples of the invention, the shutdown unit (24) is an igniter mounted at the tower bottom (22) (not indicated herein). The igniter starts to heat up the air inside cold wind tower (2). Thus, air densities inside and outside cold wind tower (2) equalize and inside-to-outside air flow stops.

In examples of the invention, the shutdown unit (24) may also be a ventilation port (26) in the wall of cold wind tower (2) and a roller blind (25) to cover up the ventilation port. When the roller blind (25) is opened, cold air flows from inside the cold wind tower through the ventilation port (26). The cold air in air outlet (221) at the tower bottom (22) flows at a lower speed with the flowrate reduced. Thus, the flowrate of cold air in the entire tower (2) is decreased. The lack of a continual cold zone leads to an unsteady state, thus the effect of air blowing is ignorable.

In examples of the invention, the height of cold wind tower (2) is preferably 200-300 m; the area of the air inlet (211) at the tower top (21) is preferably 20,000-100,000 m$^2$ and that of the air outlet (222) at the tower bottom (22) is preferably 10,000-50,000 m$^2$.

In examples of the invention, a pathway (27) inside cold wind tower (2) (shown by the dotted line in FIG. 6 is preferably an upside-down truncated-cone-type; the air inlet (211) at the tower top (21) has a larger inner diameter than the air outlet (222) at the tower bottom (22).

In examples of the invention, cold wind tower (2) is built on a ground higher than the city. The differential height between the top of cold wind tower (2) and the city is preferably 500-2,500 m. Thus, the air temperature difference between the tower top (21) and the tower bottom (22) is around 7° C., which is more favorable for the operation of the cold wind tower 2.

In examples of the invention, a system that supplies fresh air to a city may comprise at least one device that supplies fresh air to the city, to effectively eliminate the haze in the air. For instance, to eliminate the haze over Beijing and the surrounding thousands of square kilometers of areas, 1 to 2 cold wind towers may be built on a mountain in the proximity of Beijing; to eliminate the haze over Shijiazhuang, Xingtai and Handan, 1 to 2 cold wind towers may be built on a mountain in the proximity of Shijiazhuang.

In examples of the invention, if cold wind tower (2) is 300 m high, the air temperature and density differences between the tower top (21) and the tower bottom (22) are separately 2° C. and 0.7%. Such a density difference allows the cold air to enter into cold wind tower (2) to flow out from the air outlet (221) at the tower bottom (22) faster, approximately 6 m/s at the air outlet (221). Thus, a cold zone is formed downstream of the cold wind tower (2), as shown in FIG. 2.

Refer to the working principles of the cold wind tower and the cold zone in FIG. 7 and FIG. 8 respectively. When operating in a cloudless day, the cold wind tower (2) continuously receives cold air through the tower top (21). The cold air flows through the air outlet (221) at the tower bottom (22) and diffuses, gradually moving downwards along the terrain. The cold wind zone continues to expand. The temperature gradient originally formed due to the convection of natural air flows between the ground and the upper air gradually decreases and even disappears, creating a continually thickening and expanding cold zone.

The cold wind tower (2) starts to trigger the first effect. The cold wind zone is formed and keeps expanding, not only transversely but also vertically, as the upper air in the zone receives less heat from the ground. Moreover, air in the cold wind zone (T1) has a greater specific gravity than that in the hot zone outside (T2), which drives the boundary of the cold wind zone (T1) to spread around. The cold wind zone expands faster and faster, of which the lower part enlarges at a higher speed. Meanwhile, the area of the cold wind zone also increases rapidly as the cold air in the upper zone continuously flows into the cold wind zone. At this moment, the cold wind zone looks like a huge cold hole that persistently inhales surrounding cold air. The cold wind zone (T1) becomes larger and thicker. When it approaches or exceeds the height of the tower, a cold air column is formed, sufficiently high and huge. Then, the column realizes the effect of tens of thousands of cold wind towers when spreading around, as shown in FIG. 8. It is just like a Domino phenomenon. The cold zone (T1) rapidly advances to as far as tens or even hundreds of kilometers beyond. Clean and fresh air is delivered quickly and blown over the cities on the route. It takes only a few hours to replace the air of the cities.

The cold wind tower (2) triggers the first effect and creates the cold wind zone (T1). When the wind formed by air diffusing from the cold wind zone meets a natural, stronger wind from a distance, the cold wind zone shown in FIG. 8 is blown away. When such strong wind passes by, cold wind tower (2) automatically re-establishes the cold wind zone (T1) and repeats the process in FIG. 7. Once a sufficiently high and huge cold air column is formed in the cold zone, the central area of the cold wind zone (T1) is temporarily out of the relatively stable state, that is, there is a windless zone and a homothermic zone in the center of the cold air column. At this point, the center of the cold air column receives more solar radiation and starts to warm up. When the cold wind zone (T1) gradually decreases and lowers, cold wind tower (2) continues to work to trigger the second round of formation of the cold zone.

Once started, the cold wind tower (2) will work inexhaustibly unless there is a forced shutdown. Namely, the tower will work in a circulating state to continuously supply cool breeze to the city. Thus, the city will be filled with clean air and cooled down to some extent.

The process of the cold wind tower (2) forming the cold zone to dispel the haze is just as the advancement of sea waves. The cold air moves like ripples. Right after the former cold wind zone is formed, spreads and disappears, the latter is produced. The waves make steady movement forwards. As one falls, another rises.

According to the invention, the ecological effect of the tower supplying fresh air to the city is as follows: cold wind tower (2) continuously works to intensify air convection and produce regional wind (breeze or slack wind) to dispel the haze; meanwhile, the wind brings a steady flow of fresh air to the city.

As the invention primarily aims to prevent and control the haze, cold wind tower (2) is preferably built on or in a mountain having an altitude of around 1,500 m near a city where the haze pollution is severe. The differential elevation between the tower top and the city is preferably 1,000 m at the minimum so as to ensure a proper temperature difference of approximately 7° C.

The adoption of the invention can achieve the following technical effects:

(1) To prevent and restrain climate conditions of haze

As it is known, there will be no haze as long as there is wind or drop in temperature. The cold wind tower is invented just on the basis of such natural phenomena. The tower continuously delivers cold air to a city, which makes it impossible for haze particles to gather over the city. Suspended particles are diluted by thousands of times and then gradually settle.

(2) To continuously supply fresh and cold air to a city

The device and system supplying fresh air to a city constructed on the basis of the cold wind tower not only disperses the haze, but also brings fresh air from mountainous areas to the city. In summer, it brings refreshing cool breezes to the hot city, not only cooling the city down, but also benefits the people.

(3) To clean city air

The cold wind tower causes drop in temperature in a large region. When hot air from other regions meets cold air from the cold wind tower, more humid air condensates into water drops in the cold zone and thus produces clouds and light rains. This atmospheric action can help the city to purify the air.

The aforesaid is the preferred embodiments of the invention, but the scope of the present invention is not limited to it. Any modification, equivalent replacement, improvement, etc. within the spirit and principle of the invention shall fall within the protection scope of the invention.

The invention claimed is:

1. A method for regulating climate using a cold wind tower placed above a ground level, comprising the following steps:
   step 1): allowing formation of a high temperature zone around a top portion of the cold wind tower and a low temperature zone in a bottom portion of the cold wind tower, in the air above the ground;
      in the step 1), the formation of the low temperature zone above the ground includes reducing an air temperature inside the cold wind tower using a start-up unit equipped in the cold wind tower, wherein an air temperature drops, and density increases; the air flows downwards in the low temperature zone inside the cold wind tower;
   step 2): allowing formation of air convection between the high temperature zone and the low temperature zone as cold air in the low temperature zone has greater density than hot air in the high temperature zone;
      in the step 2), making the air above the low temperature zone continuously flow downwards inside the cold wind tower, wherein the air flowing downwards gradually diffuses out, from an air outlet of the cold wind tower into the atmosphere, to form a cold wind zone;
   after the step 2), the method further comprising:
   step 3): shutting down the start-up unit to form air temperature and density differences since the air temperature inside the cold wind tower is higher than the air temperature outside the cold wind tower, so that top-to-bottom air flow in steps 1 and 2 continues to be automatically generated inside the cold wind tower;
   step 4): making the cold wind zone constantly expands, a temperature gradient from the ground to upper air gradually decreases due to the natural air convection; the cold wind zone becomes thicker and larger continuously;
   step 5): the upper air above the cold wind zone undergoes decreasing heating effect of the ground, of which the temperature drops and density increases, leading to the air flow above the cold wind zone moving towards the cold wind zone; specific gravity of air in the cold wind zone is greater than specific gravity of air from a hot zone outside the cold wind zone, resulting in gradually increasing lateral expansion of the cold wind zone; cold air around the cold wind zone flows into the cold wind zone to form a cold air column therein;

step 6): driving internal cold air in the cold air column to an adjacent city, due to continual expansion of the cold air column in steps 4 and 5, to clear clarify the urban air; and step 7): when encountering natural wind with greater air flow velocity than the cold wind zone during the expansion of the cold air column, gradually blowing away the cold wind zone by the natural wind; when the natural wind passes by, automatically re-forming the cold wind zone and starting the process in step 1.

* * * * *